United States Patent [19]

Gojny et al.

[11] Patent Number: 5,013,613

[45] Date of Patent: May 7, 1991

[54] REINFORCING RINGS FOR HONEYCOMB PANELS AND METHOD AND APPARATUS FOR MAKING THEM

[75] Inventors: Francis J. Gojny, Bonita; Guy S. Greene, Borrego Springs; Roswell L. Stahl, Jr., San Diego; Charles Z. Street, La Mesa, all of Calif.

[73] Assignee: Rohr Industries, Inc., Chula Vista, Calif.

[21] Appl. No.: 275,912

[22] Filed: Nov. 25, 1988

[51] Int. Cl.$^5$ ................................................ B32B 3/12
[52] U.S. Cl. ...................................... 428/593; 428/603
[58] Field of Search .............. 428/543, 603, 116, 117, 428/118; 52/795, 796, 797, 799, 800, 806, 807

[56] References Cited

U.S. PATENT DOCUMENTS

| | | | |
|---|---|---|---|
| 2,435,391 | 2/1948 | Gunderman | 428/593 |
| 2,793,718 | 5/1957 | Pajak | 428/593 |
| 3,072,225 | 1/1963 | Cremer et al. | 52/806 |
| 3,579,942 | 5/1971 | Cole | 52/806 |
| 3,662,805 | 5/1972 | Sygnator | 428/116 |
| 3,742,673 | 7/1973 | Jennings et al. | 52/806 |
| 4,190,559 | 2/1980 | Retallick | 428/603 |
| 4,273,818 | 6/1981 | Buchs | 428/116 |
| 4,716,067 | 12/1987 | Moji et al. | 428/117 |
| 4,717,612 | 1/1988 | Shackelford | 52/806 |
| 4,810,588 | 3/1989 | Bullock et al. | 428/603 |

Primary Examiner—John J. Zimmerman
Attorney, Agent, or Firm—Patrick J. Schlesinger; Frank D. Gilliam

[57] ABSTRACT

A ring insert for locally reinforcing a panel having a honeycomb core and at least one face sheet. The ring insert has at least two adjacent corrugated foil strips wound with the surface of the strips (and the corrugations) lying substantially perpendicular to the ring axis. The corrugations in adjacent strips have substantially different corrugation curve periods to prevent nesting of the corrugations of one strip into those of the next strip. The strips are bonded together to form a unitary ring. These inserts are adapted to be placed in cut-outs of corresponding shape in a honeycomb core and to be bonded thereto and to the panel face sheets. A method and an apparatus for winding the coil are also disclosed.

5 Claims, 1 Drawing Sheet

REINFORCING RINGS FOR HONEYCOMB PANELS AND METHOD AND APPARATUS FOR MAKING THEM

BACKGROUND OF THE INVENTION

This invention is directed to improving the performance of honeycomb core structural panels by localized reinforcement and densification of the panel.

Lightweight, high strength, panels made up of a honeycomb core and one or two face sheets bonded thereto have come into widespread use in aircraft, space vehicles and the like. While the panels have great strength across a broad panel, difficulties are encountered when it becomes necessary to fasten other structures to the panels. For example, it is often necessary to have a circular access opening in a panel, covered by a circular cover overlapping the edges of the opening and fastened to the panel by fasteners such as bolts. The panel honeycomb core and face sheets do not have the strength or local resistance to deformation to accommodate the bolts and localized stress. Similar problems arise when it is necessary to fasten a circular flange to the face of a honeycomb panel.

These problems are especially significant where ducts or tubular casings are fabricated of honeycomb panels. Often, reinforcement of the ring-like end of the duct or a ring-like section along the duct is necessary, such as to provide attachment regions for duct support assemblies.

In the past, attempts have been made to improve the local strength and thermal transfer characteristics of honeycomb panels by drilling a ring of holes in the panel face sheet and injecting a synthetic resin potting compound to fill selected cells or groups of cells to locally strengthen the panel. Also, fasteners such as nuts for access cover bolts or the like may be embedded in the potting compound, as described, for example, by Moji et al in U.S. Pat. No. 4,716,067. While effective for some purposes, this method is not adaptable to all fasteners, requires considerable hand-work and care to properly fill the cells and adds considerable weight to the panel.

In other cases, a ring-like region of the honeycomb core is removed, prior to application of the face sheets, and a solid metal ring insert is placed in the cutout. The insert is typically diffusion bonded or adhesively bonded to the face sheets when those sheets are bonded to the core. While these solid inserts are effective with a great many fasteners, they tend to be heavy and add an undesirably amount of weight, which can be of critical importance in aircraft and space vehicle applications. Also, the metal inserts must have a thickness precisely matching the honeycomb core thickness. Thinner inserts allow localized crushing of the panel before the insert is encountered, while thicker inserts will cause local bulges in the panel which are undesirably in aerodynamic surfaces. Thus, special, tight tolerance, inserts must be made for every honeycomb core thickness.

Also, while the thermal insulating properties of honeycomb panels are highly desirable in many applications, in some cases it is necessary to improve heat transfer in a local area from a heat source on one side of the panel to a heat sink or the like on the other side of the panel.

Therefore there is a continuing need for improved ring-like inserts for honeycomb core panels which can increase the density, strength and thermal conductivity in local areas without excessively increasing the weight of the assembly and can be easily made to precisely match a variety of honeycomb core thicknesses.

SUMMARY OF THE INVENTION

The method and apparatus of this invention produce a reinforcing ring insert adapted to fill a corresponding cut-out in a honeycomb core to resulting in a honeycomb panel having a higher density, higher strength, reinforced ring-shaped region. At least two foil strips are corrugated with substantially different corrugation curve periods and are wound together into a ring shape with the strip surfaces and corrugations lying substantially perpendicular to the winding axis. The wound ring is bonded together to form a unitary, self supporting ring shaped insert.

The ring has a thickness corresponding to the thickness of the honeycomb core with which it is to be used. Typically, a corresponding ring of the honeycomb core is removed, such as by machining, and the inset is placed therein. Face sheets are bonded to the honeycomb and insert, forming the reinforced panel, adapted to having a cylindrical or tubular structure (such as a pipe flange or the like) fastened to the panel by fasteners penetrating the insert.

These inserts are also particularly useful in forming edge for access openings through the panel. A round opening corresponding to the outer diameter of the insert is formed in a honeycomb core. The insert is placed in the opening and face sheets having openings corresponding to the inside diameter of the ring insert are bonded over the core and insert. A conventional access opening cover having a diameter equal to the outside diameter of the ring insert can be secured over the opening with conventional edge fasteners, such as bolts through the cover edges and insert.

These ring inserts are also particularly useful in forming honeycomb core ducts. Typically, the width of the ring insert (difference between inner and outer radii of the ring wall) could match the honeycomb core thickness. The core is formed into a tube having inner and outer diameters matching those of the ring insert. The ring is then attached to the end of the core tube and tubular face sheets are bonded to the inner and outer surfaces of the core tube and the ring insert, producing a lightweight duct or casing having a reinforced end. Similar reinforcements could be spaced at appropriate locations along a longer duct or casing, replacing rings of honeycomb core, if desired.

BRIEF DESCRIPTION OF THE DRAWING

The advantages and features of this invention will become better appreciated and understood by reference to the following detailed description when taken together with the accompanying drawing, wherein.

DESCRIPTION OF PREFERRED EMBODIMENTS

Figure 1:
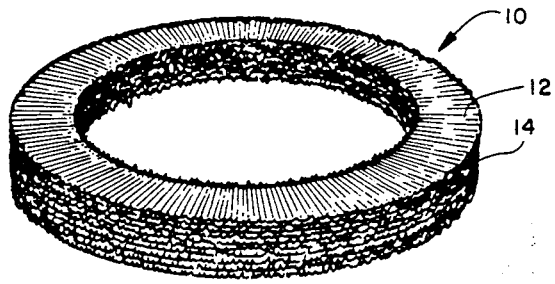
FIG. 1 is a perspective view of a reinforcing ring insert according to this invention.
Figure 2:
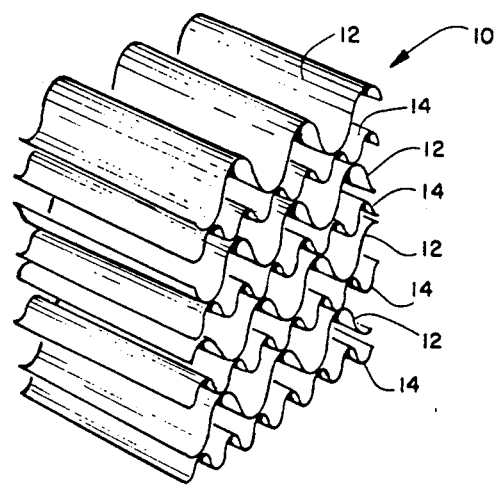
FIG. 2 is a perspective detail view showing the relationship of adjacent foil corrugations.

Referring now to FIGS. 1 and 2, there is seen a ring 10 made up of a number of layers of corrugated foil strips. As seen in detail in FIG. 2, ring 10 is laid up from strips having at least two alternating corrugation patterns. Strips 12 are deeply corrugated and have relatively long periods. Adjacent strips 14 are more shallowly corrugated and have shorter periods. If adjacent strips had the same, or very similar, corrugation patterns, the adjacent strips would tend to "nest" together, reducing severely the amount of open space in the coil and undesirably and indefinitely increasing the density of the ring. In general, the corrugation period and/or depth of strips 12 should be at least 4 times as long as those characteristics of strips 14. Strips 14 should have a minimum degree of corrugation sufficient to prevent buckling during winding, which can be determined empirically for rings of different diameters.

As seen in FIG. 2, for ease in producing the corrugations, the sine wave-like corrugations are preferred. Other configurations may be used, if desired. For example, flat strips with periodic curves offset to one or both sides or strips having sharper, more angular projections could be used.

Any suitable material can be used for strips 12 and 14. In many cases the same material as is used for the honeycomb core will be preferred, to avoid any possible galvanic action between core, face sheets and insert and limit differential thermal expansion problems. If another metal is selected, then an adhesive should be used to bond the insert to the core and face sheets in a manner which will prevent direct insert to core or face sheet contact. Typical core and insert strip materials include aluminum, titanium and titanium aluminides. While strips 12 and 14 may have any suitable thicknesses, thicknesses in the range of about 0.001 to 0.010 inch are preferred, with about 0.0035 inch generally giving optimum results.

The ring insert strips may be bonded to each other and to the core and face sheets. In many cases we prefer to coat at least one surface of at least some of the strips with a thin layer of brazing or diffusing material in a manner that will assure a brazing or diffusion bond between each strip interface in the stack. Typically, in a two-layer coil, one strip is coated with the brazing material on both sides and other strip is left bare. The strips are then bonded together by liquid interface diffusion bonding or furnace brazing; that is, by heating the ring assembly to the melting temperature of the eutectic of layer and base metal in an inert atmosphere until brazing or liquid interface diffusion bonding occurs. Typical brazing materials include copper, nickel and mixtures and combinations thereof. The layer can be very thin, typically on the order of about 0.0001 inch.

The thickness of the ring insert should ordinarily match the honeycomb core thickness quite closely, although in some cases a very slightly thicker ring insert may be used with slight compression during the bonding of the face sheets to the core and insert.

While generally unnecessary, if desired a flat ring of material having the same or different thickness and composition can be bonded to the upper and lower surfaces of ring 10 where flat surfaces are desired.

Figure 3:
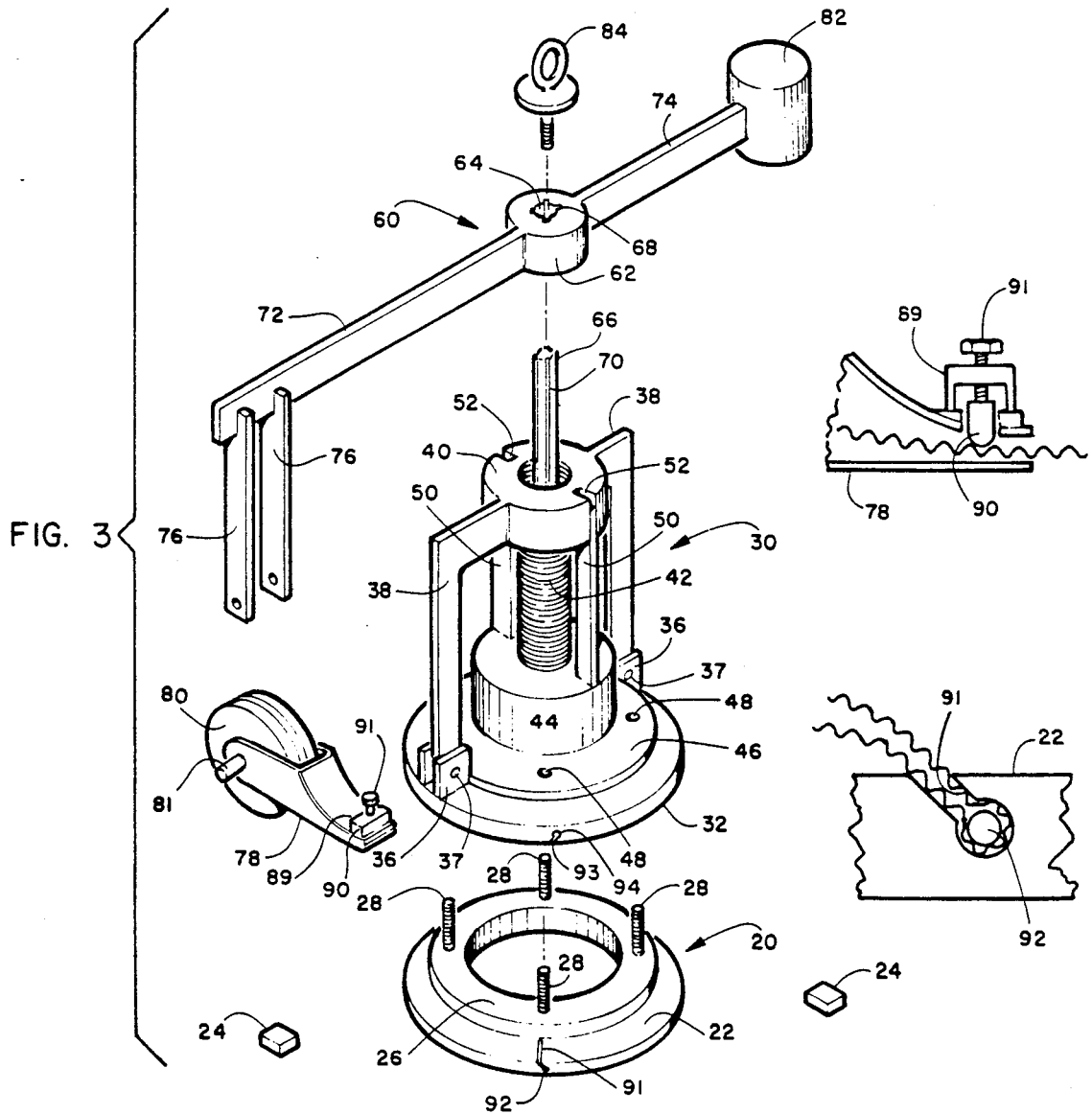
FIG. 3 is an exploded perspective view of an apparatus for forming the ring inserts.

The method and apparatus for assembling rings 10 are illustrated in FIG. 3, which shows a schematic exploded perspective view of the apparatus for winding rings 10.

Rings 10 are wound on a coil form and support plate 20. Plate 20 has an outwardly extending flange 22 having a flange width somewhat greater than the width of the ring to be formed, so that spacer blocks 24 can be placed on flange 22 adjacent to a ring thereon. An upstanding ring portion 26 of plate 20 has a thickness somewhat greater than the maximum thickness of rings to be made. The outer diameter of ring portion 26 corresponds to the inner diameter of rings 10. Several upstanding alignment pins 28 are provided to align plate 20 with other components, as detailed below.

Winding mechanism 30 winds corrugated foil strips onto flange 22 of plate 20. Mechanism 30 rests on ring-shaped spacer plate 32 having an inner diameter equal to the outer diameter of ring 26. As detailed below, spacer plate 32 is adapted to contact the upper surface of ring 10 as it is formed and to move upwardly as the thickness of ring 10 grows.

A pair of brackets 36 secured to plate 32 are removably fastened, such as by pins or bolts 37, to lifter arms 38. The second ends of arms 38 are secured to spacer plate traveler 40 which is internally threaded to mesh with spacer plate drive screw 42. A servo motor 44 is attached to the lower end of drive screw 42 to rotate the screw. Motor 44 is mounted on a base plate 46, which has several holes 48 corresponding to alignment pins 28. A pair of stabilizer bars 50 are secured to motor 44 and ride in slots 52 in traveler 40 to prevent rotation of traveler 40 and the parts fastened thereto when drive screw 42 is rotated. When motor 44 is operated, drive screw 42 rotates, causing traveler 40 and spacer plate 32 to move upwardly or downwardly relative to support plate 20.

One or more foil strip feed assemblies 60 are provided to feed corrugated foil strips into the space between support plate 20 and spacer plate 32. Only one assembly 60 is illustrated for clarity. In the embodiment shown, two foil strip feed rolls are provided on a single holder. If desired, two feed assemblies could each carry one or more feed rolls, so that two or more differently corrugated foils could be independently directed into the space between support plate 20 and spacer plate 32.

Assembly 60 includes a coiling arm traveler 62 having a bore 64 sized to fit over a coiling arm driver shaft 66 secured to drive screw 42 for rotation therewith. Shaft 66 and traveler 62 are rotatably locked together by a key 68 within bore 64 and a keyway 70 along shaft 66. An elongated coiling arm 72 extends one way from traveler 62 and a counter balance arm 74 extends in the opposite direction. A bracket 76 extends downwardly from the end of arm 72 and supports corrugated foil feed and tensioner holder 78 which holds a pair of corrugated foil supply rolls 80, each of which contains a foil having a different corrugation pattern, as detailed below. The feed end of holder 78 is positioned adjacent to the gap between support plate 20 and spacer plate 32. A counter balance 82 is provided at the end of counter balance arm 74 to balance the weight of bracket 76, holder 78 and feed roll 80. A pick-up padeye, used to lift away the winding mechanism 30 and feed assembly 60, is threaded into the upper end of shaft 66.

A second feed assembly 60, identical to that shown, could be used, having a key 68 in traveler 62 oriented to maintain the second assembly 60 at a desired angle to the first assembly 60, such as at about 90 to the first assembly. Then, each feed assembly could carry a single roll of corrugated foil, having different corrugation patterns, or each feed assembly could carry two feed rolls so that four (possibly all different) foil strips could be wound.

A typical fabrication sequence for forming rings 10 using the apparatus of FIG. 3 is as follows.

Foil strips, typically a titanium aluminide having a suitable width for the honeycomb panel design, generally from about 0.10 to 4.0 inch and a thickness of about 0.0035 inch are carefully cleaned and coated with a 0.0001 inch layer of liquid interface diffusion (LID) bonding material. The foil is corrugated, such as by passing it through loosely spaced gears having the desired gear tooth size and gear spacing. Typically, one foil may have a sine wave like corrugation with a depth of about 0.040 inch and a period of about 0.120 inch and the other having a depth of about 0.015 inch and a period of about 0.040 inch. Generally, either one foil has the LID coating on both sides or each has a LID coating on one side. The corrugated foils are rolled onto spools to form feed rolls 80. The two feed rolls are then mounted onto a holder 78 and tension is set by a pressure pad 90 (typically a Teflon fluorocarbon block) which is moved by a screw 91 in a bracket 89 to increase or decrease pressure against the foil to change the strip tension.

The servo motor 44 is then operated to move spacer plate 32 to the lower, starting, position. The ends of the two foil strips are then pulled from holder 78 and secured to flange 22 of support plate 20 by feeding the ends of the foils into a slot 91 in flange 22 and securing them by compression with a pin 92 pressed into the slot, between one slot wall and the foils. Servo motor 44 is activated, spinning the spacer plate drive screw 42 along with coiling arm drive shaft 66. As coiling arm 72 spins and elevates, the corrugated foil strips are dispensed along flange 22 with the inner edge against ring 26 of support plate 20. Spacer plate traveler 40 elevates spacer plate 32 and coiling arm 72 simultaneously. When the desired number of layers of coils are achieved, servo motor 44 is turned off. Spacer blocks 24 are placed on flange 22 next to the coil, between support plate 20 and spacer plate 32, so that the plates remain in supporting contact with the coil and prevent unwinding without overly compressing the coil. The corrugated foil strips coming from supply rolls 80 are cut and secured to spacer plate 32 by feeding the ends of the foils into slot 93 in the edge of plate 32 and secured by compression of a pin 94 inserted into slot 93 to press the foils against the slot side. Holder 78 and retaining pins 37 are removed. The upper sections of winding mechanism 30, with feed assembly 60, is removed by lifting at padeye 82, leaving spacer plate 32 resting on spacer blocks 24, the corrugated foil ring and support plate 20.

This remaining lower portion of the tool with the coiled foil ring is placed in a vacuum furnace and heated to the melting temperature of the LID/foil eutectic to bond the contacting strips together. When bonding is complete, the tool is removed from the furnace.

The foil ends which were attached to the tooling are removed, trimmed and resistance spot welded to the ring. Spacer plate 32 is removed and the complete ring 10 is removed from support plate 20. The resulting bonded ring 10 is cleaned and is then ready for installation in a honeycomb panel.

While certain specific materials, configurations, parts and dimensions were set forth in the above description of preferred embodiments, those can be varied where suitable with similar results.

We claim:

1. A ring insert for reinforcing honeycomb panel cores which comprises at least two corrugated foil strips having different corrugation periods, wound alternately in a ring shape with the surfaces of said strips and said corrugations lying substantially perpendicular to the ring axis and said strips bonded together to form a unitary ring structure.

2. The ring insert according to claim 1 wherein at least one strip at each strip-to-strip interface bears a thin surface layer of a brazing material and said strips are bonded into a unitary structure by oven brazing.

3. The ring insert according to claim 1 wherein said brazing material is selected from the group consisting of copper, nickel, titanium and mixtures and combinations thereof and said layer has a thickness of from about 0.002 to 0.00001 inch.

4. The ring insert according to claim 1 wherein said foil has a thickness of from about 0.001 to 0.010 inch and a width of from about 0.100 to 4.0 inch.

5. The ring insert according to claim 1 wherein said foil comprises aluminum and titanium.

* * * * *